United States Patent [19]
Shimizu

[11] 3,777,646
[45] Dec. 11, 1973

[54] ELECTRONIC SHUTTER FOR PHOTOGRAPHIC CAMERA

[75] Inventor: Munetaka Shimizu, Tokyo, Japan

[73] Assignee: Kabushiki Kaisha Koparu, Itabashi-ku, Japan

[22] Filed: May 19, 1972

[21] Appl. No.: 255,085

[30] Foreign Application Priority Data
May 25, 1971 Japan....... 46/42005 (utility model)

[52] U.S. Cl. ............................................. 95/53 EB
[51] Int. Cl. ............................................ G03b 9/58
[58] Field of Search....................... 95/10 CT, 53 EB

[56] References Cited
UNITED STATES PATENTS
3,650,193  3/1972  Shimizu ................... 95/53
3,645,185  2/1972  Kitai ....................... 95/53

*Primary Examiner*—Samuel S. Matthews
*Assistant Examiner*—Michael L. Gellner
*Attorney*—John W. Malley et al.

[57] ABSTRACT

In order that a designed specific exposure time, for example, one-one hundred twenty-fifths of a second, may be obtained automatically in case the electronic exposure time control means has become disabled due to causes such as dissipated battery, there is provided an electronic shutter for photographic camera comprising a hook lever adapted to anchor the armature lever for a while only when the electronic exposure time control means fails to work at the time the shutter is released, and a cam member for releasing said anchored state. This electronic shutter contains a flash light means which is rendered ready to being operative when the electronic exposure time control means is switched over to the inoperative state.

2 Claims, 2 Drawing Figures

3,777,646

ELECTRONIC SHUTTER FOR PHOTOGRAPHIC CAMERA

BACKGROUND OF THE INVENTION

1. Field of the Invention

The present invention is concerned with an electronic shutter for photographic camera, and more particularly it pertains to means for opening and closing the shutter blades.

2. Description of the Prior Art

Generally, in an electronic shutter arranged so that the exposure time is controlled electronically, the electronic exposure time control means which is assigned to determine the required exposure time will become disabled when the battery is consumed excessively. Under such a condition, the shutter is able to control only a certain single exposure time which is determined solely by the mechanical condition under which the shutter is constructed. Usually, this certain single exposure time is either one five-hundredth or one one-thousandth of a second, both of which is outside those limits of exposure time which are most often utilized in ordinary photographing. For this reason, under such a situation that the battery has become dissipated to an excessive degree and that a new set of battery for replacement is not on hand, it will become practically impossible to use the camera.

Also, when it is intended to conduct a flash light photographing by the use of an electronic shutter of the aforesaid type in a dark environment, the above-mentioned electronic exposure time control means — because of the fact that it contains an element such as a photoconductive cell having a delayed response to the changes in brightness of light — is unable to behave to meet these changes in brightness of the flash light. As a consequence, there may arise the inconvenience that the shutter blades remain opened. In order to prevent this condition from taking place, there has been proposed a shutter arrangement in which the element such as said photoconductive cell is switched over to a specific fixed resistor at the time of taking a flash light photography. However, such an improved known device had the drawbacks that not only the mechanism per se become excessively intricate but also in actual use the camera had to be operated with a great complexity.

SUMMARY OF THE INVENTION

It is, therefore, a primary object of the present invention to provide an electronic shutter having a shutter blade opening and closing means which, when the electronic exposure time control means becomes disabled due to reasons such as dissipated battery, is automatically switched over to a mechanical mode of operation to give a designed specific exposure time which may be, for example, one one-hundred twenty-fifth of a second.

Another object of the present invention is to provide an electronic shutter which can be used very satisfactorily in flash light photographing.

DESCRIPTION OF THE PREFERRED EMBODIMENT

Figure 1:
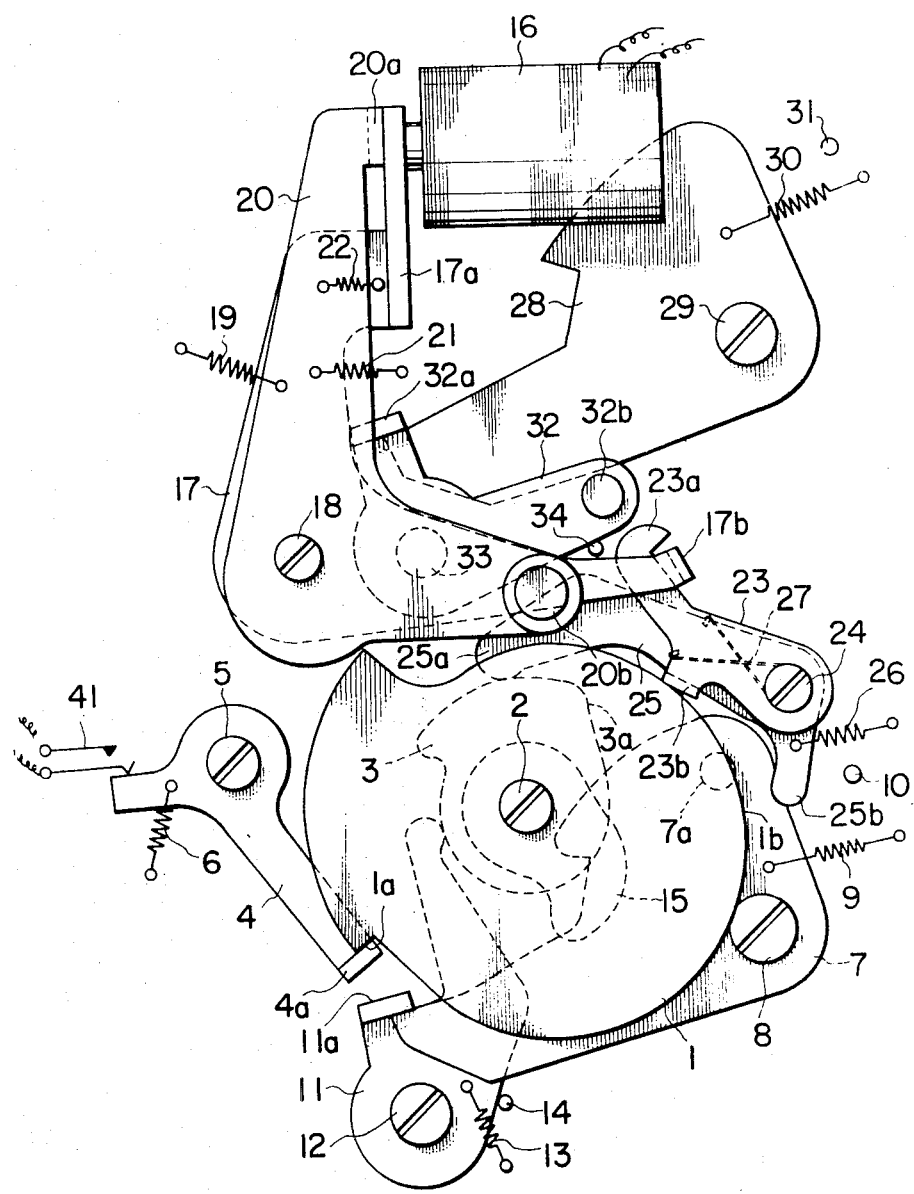
FIG. 1 is a plan view of the essential portion, in a cocked position, of an example of the shutter blade opening and closing means according to the present invention.
Figure 2:
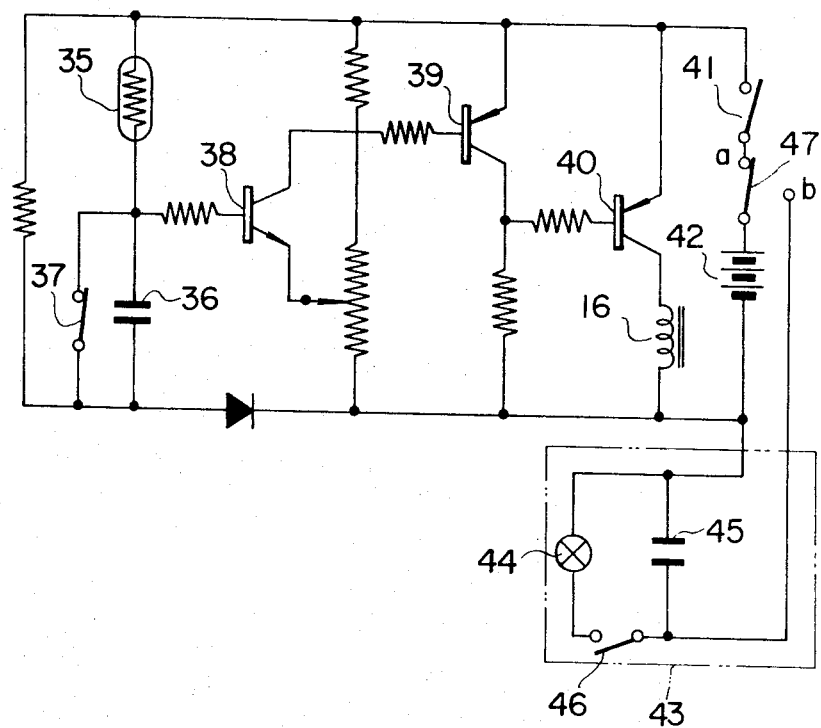
FIG. 2 is a circuit diagram showing an example of the exposure time control circuit and the flash light means which are applied to the means shown in FIG. 1.

Referring now to FIGS. 1 and 2, reference numeral 1 represents a control cam rotatably supported on a shaft 2 and provided with a hook 1a and a cam face 1b whose diameter increases progressively as it turns clockwise. This control cam 1 is urged to rotate counter-clockwise. Numeral 3 represents a cam member having a cam face 3a and provided concentrically and integrally with said control cam 1. Numeral 4 represents a release lever swingably mounted on a shaft 5 and having a bent portion 4a which is brought into engagement with the hook 1a when the shutter is cocked. Numeral 6 represents a spring for urging the release lever 4 to rotate counter-clockwise. Numeral 7 represents a shutter blade opening member pivotably supported on a shaft 8 and having a pin 7a. Numeral 9 represents a spring for urging the shutter blade opening member 7 to rotate clockwise. Numeral 10 represents a stopper for limiting the clockwise movement of the shutter blade opening member 7. Numeral 11 represents a lock lever swingably supported on a shaft 12 and having a bent portion 11a for locking the shutter blade opening member 7 at its cocked position when the shutter is cocked. Numeral 13 represents a spring for rging the lock lever 11 to rotate clockwise. Numeral 14 represents a stopper for limiting the clockwise movement of the lock lever 11. Numeral 15 represents an actuating member attached integrally to the control cam 1 and assigned to urge the lock lever 11 to rotate counter-clockwise in the final stage of the counter-clockwise movement of said control cam 1. Numeral 16 represents an electromagnet which is controlled of its conducting time by the exposure time control circuit which will be described later. Numeral 17 represents an armature lever pivotally supported on a shaft 18 and having at the end of one of its arms a pole-contacting portion 17a capable of contacting, in abutting fashion, the magnetic pole of the electromagnet 16, and having at the end of the other of the arms a bent portion 17b. Numeral 19 represents a spring for urging the armature lever 17 to rotate counter-clockwise. Numeral 20 represents a holding lever swingably mounted on the shaft 18 and having at the end of one of its arms a bent portion 20a which is brought into contact with the pole-contacting portion 17a of the armature lever 17 and having at the end of the other of the arms a roller 20b which is adapted to contact, while rotating, the cam face 1b of the control cam 1. Numeral 21 represents a spring for urging the holding lever 20 to rotate clockwise. Numeral 22 represents a spring provided between the armature lever 17 and the holding lever 20. Numeral 23 represents a hook lever pivotably supported on a shaft 24 and having at its foremost end portion a hook 23a which is engageable with the bent portion 17b of the armature lever 17 and having a bent portion 23b formed at its intermediate portion. Numeral 25 represents a control lever swingably supported on the shaft 24 and having an arm the end 25a of which is in contact with the cam face 3a of the cam member 3 and having another arm 25b protruding into the path of movement of the pin 7a of the shutter blade opening member 7 and having an intermediate portion which engages the bent portion 23b of the hook lever 23. Numeral 26 represents a spring for urging the control lever 25 to rotate counter-clockwise. Numeral 27 represents a spring provided between the hook lever 23 and the control lever 25 in such a way that these two members pull each other. Numeral 28 represents a shutter blade closing member swingably supported on a shaft 29 and urged by a spring 30 to rotate clockwise. Numeral 31 represents a stopper for limiting the clockwise rotation of the shutter blade closing member 28. Numeral 32 represents a lock lever pivotably supported on a shaft 33 and urged to rotate clockwise and having at the end of one of its arms a bent portion 32a for anchoring, at the cocked position of the shutter, the shutter blade closing member 28 in its cocked position, and having at the end of the other of its arms a pin 32b which protrudes into the path of movement of the armature lever 17. Numeral 34 represents a stopper for limiting the clockwise rotation of the lock lever 32.

FIG. 2 shows an example of known exposure time control circuits. In this drawing, numeral 35 represents a photoconductive element. Numeral 36 represents a capacitor which, together with said photoconductive element 35, forms a CR delay circuit. Numeral 37 represents a switch for actuating this CR delay circuit. Numerals 38, 39 and 40 represent transistors. Numeral 41 represents a power switch. Numeral 42 represents a battery used to serve as the power source. The electromagnet 16 is inserted in the collector circuit of the transistor 40. Numeral 43 represents a known flash light means which may be either detachably mounted on the camera body or housed within the camera body. Numeral 44 represents a flash bulb. Numeral 45 represents a capacitor. Numeral 46 represents a synchronized switch which is closed by the shutter blade opening member 7 when the latter is released. Numeral 47 represents a changeover switch.

In the arrangement described above, the relative positions of the armature lever 17 and the hook lever 23, and the magnitudes of the forces of the springs 19 and 26 are selected as follows. That is to say, the force of the spring 19 is weaker than the attracting force of the electromagnet 16 and also is weaker than the force of the spring 21. Also, the relation of engagement of the armature lever 17 with the hook lever 23 is such that these two levers are relased of their engagement when the hook lever 23 is caused to be rotatd counter-clockwise from its position illustrated via the control lever 25 when the armature lever 17 is in the state of being attracted to the electromagnet 16 as shown, and that, in the condition where the armature lever 17 is not attracted to the electromagnet 16 and where the armature lever 17 is caused to be rotated counter-clockwise from its position illustrated by the spring 19 before the hook lever 23 is rotated counter-clockwise from its position illustrated, the engagement between said armature lever 17 and the hook lever 23 is maintained as it is by virtue of a part of the counter-clockwise rotation force of the armature lever 17. Accordingly, the relative positions of the cam faces 1b and 3a are selected in such a way that when the control cam 1 is rotated counter-clockwise from its position illustrated, there first will occur a counter-clockwise rotation of the holding lever 20 caused by the cam face 1b. On the other hand, the control cam 1 is arranged so that it opens the switch 37 in the final stage of its counter-clockwise movement to actuate the CR delay circuit and that thereafter it is brought to a halt by a stopper not shown.

Next, description will be made on the actions of the apparatus of the present invention, based on the assumption that the changeover switch 47 has been switched over to the terminal a side as shown.

The release lever 4 is rotated clockwise in the cocked state of the shutter. Whereupon, first the power switch 41 is closed to render the exposure time control circuit shown in FIG. 2 operative. As a consequence, the transistor 40 is rendered conductive so that the electromagnet 16 is energized. As a result, the armature lever 17 is held in its state of being attracted to the electromagnet 16 as shown. Thereafter, as the bent portion 4a of the release lever 4 is disengaged from the hook 1a, the control cam 1, together with the cam member 3 and the actuating member 15, is rotated counter-clockwise by a drive spring not shown. Subsequently, first the holding lever 20 is caused to be rotated counter-clockwise by the cam face 1b so that the bent portion 20a of this holding lever 20 is caused to move away from the pole-contacting portion 17a of the armature lever 17, and then the control lever 25 is released of its anchored state by the cam member 3 so that the hook lever 23 is rotated counter-clockwise with the counter-clockwise movement of said control lever 25, thereby causing the hook 23a to disengage from the bent portion 17b of the armature lever 17. Thus, in the final stage of the counter-clockwise movement of the control cam 1, the lock lever 11 is rotated counter-clockwise by the actuating member 15, causing the bent portion 11a of the lock lever 11 to detach from its position of engagement with the shutter blade opening member 7. At the same time therewith, the switch 37 is opened. As a consequence, the shutter blade opening member 7 is rotated clockwise to open the shutter blades not shown. At the same time therewith, the CR delay circuit is actuated to start the counting of the exposure time. In this way, when the voltage across the terminals of the capacitor 36 which is charged through the photoconductive element 35 whose resistance value varies with the brightness of the object to be photographed gains the predetermined value, the transistor 38 is rendered conductive. As a result, the transistor 40 is rendered to the "cut-off" state, causing the electromagnet 16 to be de-energized. Since this electromagnet 16 is thus deprived of its attracting force, the armature lever 17 is caused to be rotated counter-clockwise from its position illustrated, causing the lock lever 32 to be rotated counter-clockwise. Accordingly, the bent portion 32a of this lock lever 32 is moved away from its position of engagement with the shutter blade closing member 28. As a consequence, this shutter blade closing member 28 is rotated clockwise to close the shutter blades not shown. With this, one normal exposing action completes. During this action, the power switch 41 is arranged so that once it is closed by the clockwise rotation of the release lever 4, this power switch 41 will be held in its closed state continuously till the opening and closing actions of the shutter blades come to an end.

Next, description will be directed to an instance in which the battery 42 has dissipated to such an extent that even when the power switch 41 is closed, there is produced in the electromagnet 16 no magnetic force of the predetermined magnitude. In such a condition, upon the counter-clockwise rotation of the control cam 1 caused by the release of the shutter, the armature lever 17 will tend to rotate counter-clockwise by following the counter-clockwise movement of the holding lever 20. However, the bent portion 17b of the armature lever 17 is in firm engagement with the hook 23a of the hook lever 23 by virture of a part of the force of counter-clockwise rotation of this armature lever 17, so that even after the suppression applied to the hook lever 23 by the cam face 3a is released, both the control lever 25 and the hook 23 are held in their state illustrated, against the force of their counter-clockwise movement which is caused by the spring 26. Accordingly, the armature lever 17 is first held in its state shown and thereafter the control cam 1 is rotated counter-clockwise up to its final position to cause the lock lever 11 to be rotated counter-clockwise by the actuating member 15. As a result, the shutter blade opening member 7 is rotated clockwise so that the shutter blades are opened, and the control lever 25 is coercively rotated counter-clockwise by the pin 7a. As a consequence, the engagement between the hook lever 23 and the armature lever 17 is released for the first time. In this way, the armature lever 17 rotates counter-clockwise. Thereafter, the shutter blades are closed in the order as described above. As will be clear from the foregoing statement, the time interval from the time the shutter blades are opened till the time they are closed may be set to, for example, one one-hunded twenty-fifth of a second, by appropriately selecting the depth of engagement between the armature lever 17 and the hook lever 23 and also the distance between the control lever 25 and the pin 7a of the shutter blade opening member 7 which is produced when these two members are in the state of having parted away from each other. The cocking of the shutter is performed by first rotating the control cam 1 clockwise up to the position at which the hook 1a is brought into engagement with the bent portion 4a of the release lever 4, and along therewith by rotating counter-clockwise both the shutter blade opening member 7 and the shutter blade closing member 28 simultaneously up to the position at which these two members are brought into engagement with the lock lever 11 and 32, respectively.

Description has been made with respect to the mode of operation where the changeover switch 47 has been switched over to the terminal a side. By switching this changeover switch 47 to the terminal b side, the flash light means 43 is connected to the battery 42 so that the flash light means 43 is rendered to a state ready for performance. It should be noted with respect to this latter mode of operation that the exposure time control circuit is rendered inoperative and that, accordingly, the shutter blade opening and closing means will behave in the same fashion as that caused where the battery 42 has dissipated. Accordingly, when the shutter blade opening member 7 is rotated clockwise as a result of a shutter release operation as described previously, and when accordingly the shutter blades are opened, the synchronized switch 46 is closed so that the flash bulb 44 is lighted up and thus a flash light photographing is performed. As stated above, according to the present invention, it will be understood that by a mere switching-over of the changeover switch 47, the flash light means is rendered to the state ready for performance and the shutter is rendered automatically to the state suitable for a flash light photoraphing.

In the embodiment described above, the shutter blades are opened and closed by rotating both the shutter blade opening member 7 and the shutter blade closing member 28 in the same direction. It is also possible to modify the mechanism, within the scope of the present invention, so that the shutter blades are opened and closed by arranging these two members 7 and 28 to rotate in the opposite directions and arranging them to associate with a single sector ring or like means and by causing said sector ring or like means to make reciprocating movements at the time the shutter is released.

I claim:

1. An electronic shutter for photographic camera, comprising an exposure time control circuit, a battery connected to said exposure time control circuit, an electromagnet connected to said exposure time control circuit, an armature lever having at one end thereof a pole-contacting portion facing the magnetic pole of said electromagnet, a holding lever provided adjacent to said armature lever and arranged so as to urge said pole-contacting portion against the magnetic pole of said electromagnet, a control cam member having a cam member provided thereon and having a cam portion engageable with said holding lever, a shutter blade opening member provided adjacent to said control cam member and arranged so as to be released by said control cam member in the final stage of movement of said control cam member, a shutter blade closing member provided adjacent to said armature lever and arranged so as to be released by said armature lever as the latter moves, a hook lever provided adjacent to said control cam member and having at one end thereof a hook portion engageable with said armature lever, and a control lever carried by said hook lever and having two arms engageable with said cam member and said shutter blade opening member, respectively, said electronic shutter being operative so that upon the shutter release operation, said armature lever is anchored by said hook lever only when said armature lever tends to move without being attracted to said electromagnet and held there, and that this anchored state is released by the shutter blade opening member as this member moves.

2. An electronic shutter for photographic camera according to claim 1, in which said electronic shutter comprises a changeover switch having one end connected to said battery and a flash light means having one end connected to said exposed time control circuit, and is arranged so that said exposure time control circuit and said flash light means may be used alternatively by swtiching over said changeover switch.

* * * * *